United States Patent Office 3,042,656
Patented July 3, 1962

3,042,656
UNSATURATED POLYESTER INCLUDING AS REACTANTS BENZENE TRICARBOXYLIC ACID AND A GLYCOL MONOALKYL ETHER
Horst E. Frey, Chicago, Ill., assignor to Standard Oil Company, Chicago, Ill., a corporation of Indiana
No Drawing. Filed July 18, 1960, Ser. No. 43,279
16 Claims. (Cl. 260—77)

This invention relates to unsaturated polyester and also to copolymeric compositions of these with ethylenic or allylic monomers.

Unsaturated polyesters are suitable for many applications wherein the resin is applied and then converted to the final desired solid, virtually insoluble material by means of a polymerization reaction. Typical present day unsaturated polyesters are prepared from phthalic anhydride, ethylene or propylene glycol, and maleic anhydride. In the present time, unsaturated polyesters are particularly useful in the reinforced plastics industry wherein an unsaturated polyester resin and a styrene are copolymerized, in the presence of a peroxy catalyst, about a reinforcing material such as glass fiber. These articles are strong and durable, however, they suffer in strength retention after exposure to water for prolonged periods of time.

A further drawback of these phthalic acid type resins is the high viscosity of the solutions of resin in styrene. Low viscosity is desired in order to improve the speed of impregnation of the reinforcing fiber, and also to simplify handling of the solution in spray operations and to decrease the amount of styrene needed for easy handling.

A modified unsaturated polyester has been discovered, which consists essentially of: the reaction product of (a) benzene tricarboxylic acid selected from the class consisting essentially of trimellitic acid, trimellitic anhydride, trimesic acid, hemimellitic acid and hemimellitic anhydride, (b) alkylene glycol monoalkyl ether containing 1 to 8 ether groups, 2–3 carbon atoms in each alkylene unit, and 1–8 carbon atoms in the alkyl group, (c) alkenedioic acid selected from the class consisting of maleic acid, fumaric acid, citraconic acid and corresponding anhydrides, and (d) dihydric alcohol containing 2–8 carbon atoms, all reacted under polyesterification condensation reaction conditions, said reactants being charged to the condensation zone, in a mole ratio basis of: benzene acid to ether, about 10:1–1:1, benzene acid to alkenedioic acid, 9:1–1:9; and about sufficient glycol to react with the remaining free-carboxyl groups. The polyester may be further modified in characteristics by incorporation in addition to the above reactants, a phthalic acid or phthalic anhydride.

In the modified unsaturated polyester, the polycarboxylic acid is a benzene tricarboxylic acid containing no substituents other than carboxyl or anhydride groups. These acids are trimellitic acid, trimellitic anhydride, trimesic acid, hemimellitic acid and hemimellitic anhydride.

Maleic acid, fumaric acid, citraconic acid, and the corresponding anhydride are the alkenedioic acids providing the unsaturation in the polyester.

The modified polyester reactant includes alkylene glycol monoalkyl ether. This ether contains from 1 to 8 ether groups; each alkylene unit present in ether contains from 2 to 3 carbon atoms, i.e., the alkylene units are either ethylene or propylene; the alkyl group present in the ether contains from 1 to 8 carbon atoms. Numerous species of the defined ethers are available commercially under the "Cellosolve" and the "Carbitol" trade names. The "Cellosolves" are alkylation reaction products of simple glycols and alkanols. The "Carbitols" are alkylation reaction products of ether glycols and alkanols. Illustrative glycols are ethylene glycol and propylene glycol. Illustrative ether glycols are diethylene glycol, triethylene glycol, tetraethylene glycol, and polyethylene glycols containing not more than 8 ether linkages; dipropylene glycols containing not more than 8 ether linkages, tripropylene glycol, and polypropylene glycols containing not more than 8 ether linkages. Illustrative alkanols are methanol, ethanol, isopropanol, n-butanol, t-butyl alcohol, and octanol. Illustrative of the nomenclature utilized herein is the alkylation product of diethylene glycol with ethanol which product is known as diethylene glycol monoethyl ether or 2-(2-ethoxyethoxy)ethanol or (ethyl)"Carbitol." And the product of ethanol and ethylene glycol is known as ethylene glycol monoethyl ether or 2-ethoxyethanol or (ethyl)"Cellosolve."

The dihydric alcohol is an alkylene glycol containing 2–8 carbon atoms. These may be either simple glycols or ether glycols. Examples of suitable glycols are ethylene glycol, butylene glycol, hexanediol, diethylene glycol, dipropylene glycol, and triethylene glycol. It is preferred to utilize alkylene glycols containing 2–4 carbon atoms.

The phthalic acid of the further modified polyester is either phthalic acid, phthalic anhydride, isophthalic acid, terephthalic acid.

The benzene tricarboxylic acid and the defined ether are prereacted—when no phthalic acid is used in the condensation—to produce a monoester of some or all of the tricarboxylic acid. Otherwise all reactants may be added to the reaction vessel simultaneously. The benzene tricarboxylic acid and the ether are charged—when not prereacted—in a mole ratio of about 10:1–1:1; a ratio of about 2:1–1:1 is preferred.

The mole ratio of benzene tricarboxylic acid to alkenedioic acid charged is dependent upon the qualities desired in the particular final resin; this ratio may be from about 9:1–1:9 and preferably this mole ratio is about 2:1–1:2.

Sufficient glycol is charged to the reaction zone to react with the free-carboxyl groups remaining therein after accounting for the hydroxyl groups provided by the ether. Usually, an excess of glycol is charged and it is preferred to charge about 102–120% of the glycol theoretically needed to react with the remaining free-carboxyl groups. The theoretical requirements are to be understood as the amount of glycol afforded hydroxyl groups needed to react with the carboxyl groups present in the reaction zone which have not theoretically been reacted with the hydroxyl groups afforded by the ether.

When the charge includes both benzene tricarboxylic acid and phthalic acid the respective mole ratio may vary from about 1:9 to 9:1. The particular mole ratio will be dependent upon the properties desired in the final resin. However, the sum of the benzene tricarboxylic acid and the phthalic acid must provide a mole ratio of the sum to the alkenedioic acid present of 1:9–9:1 and preferably 1:2–2:1. (In this instance, the glycol once again is present in an amount sufficient to react with the free-carboxyl groups and preferably in the 102–120% amount set forth above.)

The unsaturated polyester reaction zone is provided, in the normal fashion, with a reflux condenser provided with a water trap-out. This permits returning ether and glycol to the reaction zone and discard of the water produced in the polyesterification condensation reaction. The condensation reaction is carried out at elevated temperatures normal for this type of reaction, for example, 400–550° F. The particular temperature is dependent upon the particular set of reactants. It has been observed that operation at a temperature such as 400° F. with return of ether to the reaction zone is suitable. It is to be understood that the polyesterification condensation reaction follows very much the normal procedure for these types of reactions, such as, described in Chapter II, "Polyesters and Their Applications," Reinhold, 1956.

The unsaturated polyester may be recovered from the reaction zone and utilized as a molding powder. Or the recovered polyester may be, in a separate operation, dissolved in a polymerizable monomer and utilized for copolymerization. It is more usual to dissolve the hot resin in the reaction zone with the monomer and thereby obtain the copolymerization solution immediately. Herein the polymerizable monomer is a ethylenic or allylic monomer and includes styrene itself, alpha methyl styrene, the various dimethyl styrenes, divinyl benzene, trivinyl benzene, ethyl styrene, and diethyl styrene; or any type of acrylic or methacrylic monomer; or allylic monomer such as diallylphthalate, diallylisophthalate or triallylcyanimate.

In the preparation of a styrene solution, the polyester is cooled to a temperature on the order of 200–300° F. as determined by viscosity of the polyester and viscosity of the polyester solution. Normally polymerization inhibitors such as hydroquinone are added in order to avoid copolymerization during the preparation of the solution and during storage thereafter.

ILLUSTRATIONS

For purpose of illustration, the apparatus, and general procedure typically used in the preparation of unsaturated polyesters of the invention (which is also suitable for conventional unsaturated polyester), is described in detail herein below. It is to be understood that this is a typical procedure and is not limiting of the scope and procedures which may be utilized in the preparation of the polyesters of the invention.

*Apparatus.*—In the laboratory, it is preferred to use 1,000 ml. round bottom flasks fitted with a Teflon stirrer through a ground glass neck, a bulb type reflux condenser with four of the five bulbs packed with glass beads. Steam is passed through this reflux condenser to permit passage of water or azeotrope vapor. On the top of this condenser is mounted a Dean-Stark type water trap and on top of same, is a water-cooled reflux condenser. Also connected with the flask is a nitrogen inlet and thermometer.

*Procedure.*—The trimellitic anhydride and the glycol alkyl ethers were placed into the reaction vessel first and were heated, under agitation, to 350° F. and kept at that temperature for about 15 minutes. Then, after cooling to about 250° F., the other materails were added and the entire mixture polyesterified for about 8 hours at 400 to 430° F. until an acid number of about 30 was reached.

The styrene monomer was added to the completed polyester at about 250° F. 0.01% hydroquinone was added as a polymerization inhibitor. 70% by weight solutions of the polyester in styrene were easily made.

Polyester I was made from the following:

| | Grams |
|---|---|
| Trimellitic anhydride | 64 |
| Butyl "Cellosolve" | 41 |
| Isophthalic acid | 166 |
| Maleic anhydride | 65.4 |
| Propylene glycol | 167 |

Polyester II was made from the following:

| | Grams |
|---|---|
| Trimellitic anhydride | 64 |
| Butyl "Carbitol" | 52 |
| Isophthalic acid | 166 |
| Maleic anhydride | 65.4 |
| Propylene glycol | 167 |

The 70% solutions in styrene had the following viscosities at 25° C.: Polyester I, 5,500 centipoises; Polyester II, 3,440 centipoises. (With the conventional phthalic acid only unsaturated polyesters, 50–60° solutions are the maximum concentrations.)

CASTINGS

Sheets of clear copolymer were prepared by a casting procedure. The casting procedure afforded ⅛" thick plates. These clear plates were sawed into boards suitable for testing according to ASTM D–790–58T (Flexural Strength and Modulus).

The mold was made of mirror finished brass sheets maintained at a clearance of ⅛" by means of rubber gaskets. The two sheets were held together by spring clamps. The solution is poured into the mold in such a manner that air pockets are avoided. The curing cycle is: 170° F. at the end of the first hour; maintained at 170° F. for one hour; heated to 250° F., which temperature is reached at the third hour; maintained at 250° F. for one hour, then turn off the heat and allow the mold to remain in the oven until room temperature is reached.

When a styrene solution is used to form the casting, 2% of a 50% suspension of benzoyl peroxide in tricresyl phosphate is added and the two stirred at moderate speed for about 5 minutes. (It is to be understood that any of the conventional peroxy type catalysts or organic azo compound catalysts suitable for polymerizing the defined monomers may be utilized in the copolymerization step. Illustrations of other catalysts are set-out at pp. 48–51 "Polyesters and Their Applications," Reinhold, 1956.)

LAMINATING

No. 181 glass cloth finished with vinyl trichlorosilane is cut into pieces of appropriate size (e.g., 6 x 8 inches) and catalyzed styrenated polyester resin is poured onto each layer. Air is allowed to escape. Thorough wetting of the glass fabric is essential. Depending on the viscosity of the resin, it takes two to four hours to complete a twelve ply lay-up. The lay-up is placed between sheets of Mylar polyester film and placed in a press at 180° F. Contact pieces or a steel frame of exactly ⅛ of one inch thickness are being used so that the ultimate pressure will not actually be carried by the laminate. Slow and gradual closing of press platens is important to allow excess resin to flow out. The final weight ratio of glass to polyester resin is approximately 2:1 if the above materials and conditions are used. After 30 minutes press time at 180° F., the laminate is further cured in an oven for two hours at 250° F.

The flexural strength and modulus of laminates was determined according to the procedure set out for castings; the results are given in Table 1 below.

*Table 1*

| | I | II |
|---|---|---|
| Casting: | | |
| Flexural Strength (p.s.i.) | 14,200 | 15,000 |
| Modulus (−×10³) | 542 | 502 |
| Laminate: | | |
| Flexural Strength (p.s.i.) | 60,900 | 56,400 |
| Modulus (−×10³) | 2,890 | 2,720 |

Laminates were immersed in boiling water for 24 hours and then subjected to the flexural strength tests. In each instance, the strength retention was over 90% of the original.

Thus having described the invention, what is claimed is:

1. An unsaturated polyester consisting essentially of the reaction product of (*a*) benzene tricarboxylic acid selected from the class consisting of trimellitic acid, trimellitic anhydride, trimesic acid, hemimellitic acid and hemimellitic anhydride, (*b*) alkylene glycol monoalkyl ether containing 1 to 8 ether groups, 2–3 carbon atoms in each alkylene unit and 1–8 carbon atoms in the alkyl group, (*c*) alkenedioic acid selected from the class consisting of maleic acid, fumaric acid, citraconic acid and anhydrides thereof, and (*d*) alkylene glycol having 2–8 carbon atoms, all reacted under polyesterification condensation reaction conditions with continuous removal of water produced in the reaction, said reactants being charged to the condensation zone, in a mole ratio basis of: benzene acid to ether, about 10:1–1:1; benzene acid to alkenedioic acid, 9:1–1:9; and about sufficient glycol to react with remaining free-carboxyl groups.

2. The polyester of claim 1 wherein said benzene acid is trimellitic anhydride.

3. The polyester of claim 1 wherein said alcohol has 2–4 carbon atoms.

4. The polyester of claim 1 wherein said benzene acid to ether ratio is about 2:1–1:1.

5. The polyester of claim 1 wherein said benzene acid to alkenedioic acid ratio is about 2:1–1:2.

6. The polyester of claim 1 wherein said ether is diethylene glycol monobutyl ether.

7. The polyester of claim 1 wherein said glycol is propylene glycol.

8. The polyester of claim 1 wherein said alkenedioic acid is maleic anhydride.

9. An unsaturated polyester consisting essentially of the reaction product of (a) benzene tricarboxylic acid selected from the class consisting of trimellitic acid, trimellitic anhydride, trimesic acid, hemimellitic acid and hemimellitic anhydride, (b) alkylene glycol monoalkyl ether containing 1 to 8 ether groups, 2–3 carbon atoms in each alkylene unit and 1–8 carbon atoms in the alkyl group, (c) alkenedioic acid selected from the class consisting of maleic acid, fumaric acid, citraconic acid and anhydrides thereof, (d) alkylene glycol having 2–8 carbon atoms, and (e) phthalic acid selected from the class consisting of phthalic acid, phthalic anhydride, isophthalic acid and terephthalic acid reacted under polyesterification condensation reaction conditions with continuous removal of water produced in the reaction, said reactants being charged to the condensation zone, in a mole ratio basis of: benzene acid to ether, about 10:1–1:1; benzene acid to alkenedioic acid, 9:1–1:9; benzene acid to phthalic acid, about 1:9–9:1; the sum of the benzene acid and phthalic acid to alkenedioic acid, 1:9–9:1; and sufficient glycol to react with remaining free-carboxyl groups.

10. The polyester of claim 9 wherein said ratio of the sum of the benzene acid and phthalic acid to alkenedioic acid is 2:1–1:2.

11. The polyester of claim 9 wherein said phthalic acid is isophthalic acid.

12. An unsaturated polyester consisting essentially of the reaction product of (a) trimellitic anhydride, (b) alkylene glycol monoalkyl ether containing 1 to 8 ether groups, 2–3 carbon atoms in each alkylene unit and 1–8 carbon atoms in the alkyl group, (c) alkenedioic acid selected from the class consisting of maleic acid, fumaric acid, citraconic acid and anhydrides, thereof, and (d) alkylene glycol having 2–4 carbon atoms, reacted under polyesterification condensation reaction conditions with continuous removal of water produced in the reaction, said reactants being charged to the condensation zone, in a mole ratio basis of: trimellitic anhydride to ether; about 2:1–1:1; trimellitic anhydride to alkenedioic acid, 2:1–1:2; and about 102–110% of the glycol theoretically needed to react with remaining free-carboxyl groups.

13. The polyester of claim 12 wherein said ether is diethylene glycol monobutyl ether.

14. The polyester of claim 12 wherein said alkenedioic acid is maleic anhydride.

15. The polyester of claim 12 wherein said glycol is propylene glycol.

16. The resin of claim 12 wherein said anhydride and said ether are prereacted prior ot the condensation reaction.

References Cited in the file of this patent
UNITED STATES PATENTS

| | | |
|---|---|---|
| 2,319,575 | Agens | May 18, 1943 |
| 2,562,878 | Blair | Aug. 7, 1951 |